United States Patent
Noguchi et al.

(10) Patent No.: US 10,697,775 B2
(45) Date of Patent: Jun. 30, 2020

(54) TRAVEL DISTANCE CALCULATION DEVICE, CHARGING SYSTEM, TRAVEL DISTANCE CALCULATION METHOD, PROGRAM, AND STORAGE MEDIUM

(71) Applicant: MITSUBISHI HEAVY INDUSTRIES MACHINERY SYSTEMS, LTD., Hyogo (JP)

(72) Inventors: Naoshi Noguchi, Tokyo (JP); Yoshifumi Hayakawa, Tokyo (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 0 days.

(21) Appl. No.: 16/313,111

(22) PCT Filed: Sep. 7, 2016

(86) PCT No.: PCT/JP2016/076305
§ 371 (c)(1),
(2) Date: Dec. 24, 2018

(87) PCT Pub. No.: WO2018/047254
PCT Pub. Date: Mar. 15, 2018

(65) Prior Publication Data
US 2019/0219399 A1 Jul. 18, 2019

(51) Int. Cl.
*G07B 15/06* (2011.01)
*G01C 21/14* (2006.01)
(Continued)

(52) U.S. Cl.
CPC ......... *G01C 21/14* (2013.01); *G01C 21/005* (2013.01); *G01C 22/00* (2013.01); *G01S 19/42* (2013.01);
(Continued)

(58) Field of Classification Search
CPC ......... H04W 48/04; H04W 4/02; H04W 4/22; H04W 28/0289; H04W 88/06;
(Continued)

(56) References Cited

U.S. PATENT DOCUMENTS

| 5,898,390 A | 4/1999 | Oshizawa et al. |
| 2007/0182628 A1* | 8/2007 | Pomerantz ............ G01S 19/06 342/357.43 |

(Continued)

FOREIGN PATENT DOCUMENTS

| JP | 07306056 A | 11/1995 |
| JP | H09119842 A | 5/1997 |

(Continued)

OTHER PUBLICATIONS

International Search Report and Written Opinion for International Application No. PCT/JP2016/076305 dated Dec. 13, 2016; 13pp.

*Primary Examiner* — Nimesh Patel
(74) *Attorney, Agent, or Firm* — Kanesaka Berner and Partners LLP

(57) ABSTRACT

A travel distance calculation device includes: a first travel distance calculation unit configured to calculate a travel distance of a vehicle on the basis of position information on the vehicle obtained through position determination using a GNSS satellite; a second travel distance calculation unit configured to calculate a travel distance of the vehicle on the basis of the number of rotations of a tire that the vehicle includes; and a calculation-means selecting unit configured to select calculation means configured to calculate the travel distance of the vehicle from among the first travel distance calculation unit and the second travel distance calculation unit on the basis of at least one of the position information on the vehicle obtained through position determination (Continued)

using the GNSS satellite and information indicating a state of communication with the GNSS satellite.

11 Claims, 7 Drawing Sheets

(51) Int. Cl.
| | |
|---|---|
| G01C 22/00 | (2006.01) |
| G01S 19/49 | (2010.01) |
| G01C 21/00 | (2006.01) |
| G01S 19/42 | (2010.01) |
| G06Q 30/02 | (2012.01) |

(52) U.S. Cl.
CPC .......... *G01S 19/49* (2013.01); *G06Q 30/0284* (2013.01); *G07B 15/06* (2013.01)

(58) Field of Classification Search
CPC ..... H04W 48/02; H04W 48/06; H04W 48/08; H04W 48/12; H04W 28/0284; H04W 28/10; H04W 36/22; H04W 36/32; H04W 4/00; H04W 4/021; H04W 4/027; H04W 60/04; H04W 64/006; H04W 72/0486; H04W 76/007; H04W 40/20; H04W 48/10; H04W 4/023; H04W 4/08; H04W 52/0216; H04W 72/0493; H04W 72/06; H04W 72/1252; H04W 8/18; H04W 4/12; H04W 4/80; H04W 88/02; H04W 4/025; H04W 4/029; H04W 4/60; H04W 52/0251; H04W 4/046; H04W 84/12; H04W 4/40; H04W 84/042; H04W 68/00; H04M 1/72577; H04M 1/67; H04M 1/72563; H04M 1/72569; H04M 1/72572; H04M 2242/04; H04M 2242/30; H04M 1/72522; H04M 1/72533; H04M 1/0266; H04M 2250/02; H04M 2250/10; H04M 1/6505; H04M 19/04; H04M 2250/60; H04M 1/64; H04M 2250/74; H04M 3/533; H04M 11/007; H04M 3/42; H04Q 2213/13098; H04Q 2213/13164; H04Q 3/0091; Y02D 70/00; Y02D 70/164; Y02D 70/166; Y02D 70/168; Y02D 70/26; B60W 2050/146; B60W 2550/308; B60W 2720/10; B60W 2750/308; B60W 30/146; B60W 30/16; B60W 2530/20; B60W 40/06; B60W 40/064; B60W 40/10; B60W 10/08; B60W 2050/0057; B60W 20/00; B60W 20/40; B60W 2520/10; B60W 2530/16; B60W 2540/10; B60W 2550/402; B60W 30/02; B60C 23/061; B60C 2200/02; B60C 2200/10; B60C 19/00; B60C 19/001; B60C 11/246; B60C 23/04; B60C 11/1218; B60C 11/24; B60C 2019/004; B60C 11/243; G01C 21/28; G01C 21/30; G01C 21/26; G01C 21/165; G01C 22/00; G01C 22/02; G01C 21/04; G01C 21/36; G01C 22/002; G01C 25/00; G01C 21/32; G01C 21/20; G01C 25/005; G01C 21/3415; G01C 21/3492; B60G 17/0195; B60G 21/08; B60G 2400/824; B60G 2400/922; B60G 2600/04; B60G 2600/70; G07B 15/063; G07B 15/06; G07B 15/02; G07B 15/00; G01S 19/42; G01S 19/14; G01S 19/13; G01S 19/40; G01S 19/41; G01S 19/50; G01S 19/53; G01S 5/0027; G08G 1/0175; G08G 1/017; G08G 1/205; G08G 1/052; G08G 1/015; G08G 1/054; G08G 1/202; G08G 1/0112; G08G 1/0129; G08G 1/0145; G08G 1/096791; G08G 1/20; G08G 1/207; G08G 1/0133; G06Q 30/0283; G06Q 50/30; G06Q 30/0284; G06Q 20/145; G06Q 10/06312; G06Q 2240/00; G06Q 30/0206; G05D 1/0278; G05D 1/0287; G05D 1/0891; G05D 2201/02; G05D 1/0274; G06K 2209/15; G06K 2209/23; G06K 9/00624; G06K 9/00771; G06K 9/00785

See application file for complete search history.

(56) References Cited

U.S. PATENT DOCUMENTS

| | | | |
|---|---|---|---|
| 2007/0216364 A1* | 9/2007 | Martinez-Olague | ........................ G07B 15/063 320/132 |
| 2009/0157566 A1* | 6/2009 | Grush | ..................... G01C 21/28 705/400 |
| 2012/0232793 A1* | 9/2012 | Hagiwara | .............. G01C 21/28 701/518 |
| 2012/0264446 A1* | 10/2012 | Xie | ......................... G01C 22/00 455/456.1 |
| 2015/0325059 A1* | 11/2015 | Mart Nez Alvaro | .. G07B 15/06 705/13 |
| 2016/0341557 A1* | 11/2016 | Kondo | ................... G01C 21/28 |
| 2017/0255843 A1* | 9/2017 | Elwart | .................. B60W 10/18 |

FOREIGN PATENT DOCUMENTS

| | | |
|---|---|---|
| JP | 2001074495 A | 3/2001 |
| JP | 2005257665 A | 9/2005 |
| JP | 2007033278 A | 2/2007 |
| JP | 2009199442 A | 9/2009 |
| JP | 2011117739 A | 6/2011 |
| KR | 1020060063334 A | 6/2006 |
| KR | 1020100019598 A | 2/2010 |

* cited by examiner

US 10,697,775 B2

TRAVEL DISTANCE CALCULATION DEVICE, CHARGING SYSTEM, TRAVEL DISTANCE CALCULATION METHOD, PROGRAM, AND STORAGE MEDIUM

RELATED APPLICATIONS

The present application is a National Phase of International Application Number PCT/JP2016/076305 filed Sep. 7, 2016.

TECHNICAL FIELD

The present invention relates to a travel distance calculation device, a charging system, a travel distance calculation method, a program, and a storage medium.

BACKGROUND ART

Moves are underway to collect tolls from vehicles travelling on all roads including highways and general roads to, for example, generate revenue for road infrastructure and easing traffic congestion. In the case of such toll charging, different charging methods may be used for charge applicable sections operated by different road charging bodies. In case of highways, charging methods differ depending, for example, on road sections managed by different road management entities. In case of general roads, charging methods differ depending, for example, on road management municipalities that manage each road section. In addition, in the case where a vehicle travels in a section on a private road, this section is excluded from the charging target.

Of various charging methods, a method for making a charge according to the travel distance of a vehicle in each of the charge applicable sections may be considered as an appropriate method for making a charge according to the charge applicable sections. If a charge is made according to the travel distance of a vehicle, it is necessary to obtain the accurate travel distance of a vehicle. The method for obtaining the travel distance of a vehicle includes, for example, a method of performing map matching on the basis of map information and position information obtained through position determination using the Global Navigation Satellite System (GNSS) to presume the travel path of the vehicle on the map information, and calculating the travel distance on the basis of the presumed travel path. In addition, there exists a method of measuring the travel distance using an odometer mounted on the vehicle.

A related technique is described in Patent Document 1, which includes a method of comparing a measured value of the travel distance of a vehicle using an odometer with the travel distance of the vehicle based on the result of position determination using the GNSS to correct the travel distance detected using the odometer. The travel distance per pulse outputted from the odometer is known to vary depending on types of vehicle or vehicle manufacturers. Patent Document 1 describes a method for correcting the variation of the travel distance per pulse among individual vehicles.

CITATION LIST

Patent Document

Patent Document 1: JP H09-119842 A

SUMMARY OF INVENTION

Problem to be Solved by the Invention

To make a charge in a highly precise manner, accurate information on the travel distance of a vehicle is necessary. However, in the case where the travel distance is calculated using the method described above, the travel distance may not be calculated accurately. For example, in the case where the travel distance is calculated through map matching, the accurate travel distance may not be obtained when electromagnetic waves from GNSS satellites are reflected or blocked in areas with high-rise buildings. In addition, in the case where the travel distance is calculated using an odometer, errors from the actual travel distance may occur, for example, due to the size of tires that the vehicle is fitted with or effects of air pressures of tires. Various proposals for increasing accuracy in calculating the travel distance have been made for the calculation methods. However, no method has been provided to calculate the travel distance of a vehicle that travels on roads under various situations, using a calculation method that matches each road environment.

An object of the present invention is to provide a travel distance calculation device, a charging system, a travel distance calculation method, a program, and a storage medium, which can solve the problem described above.

Solution to Problem

According to a first aspect of the present invention, a travel distance calculation device (10) includes:

a first travel distance calculation unit (12) configured to calculate a travel distance of a vehicle (2) on the basis of position information on the vehicle obtained through position determination using a GNSS satellite;

a second travel distance calculation unit (13) configured to calculate a travel distance of the vehicle on the basis of the number of rotations of a tire that the vehicle includes; and a calculation-means selecting unit (16) configured to select calculation means configured to calculate the travel distance of the vehicle from among the first travel distance calculation unit and the second travel distance calculation unit on the basis of at least one of the position information on the vehicle obtained through position determination using the GNSS satellite and information indicating a state of communication with the GNSS satellite.

The appropriate calculation means for the travel distance can be selected from the first travel distance calculation unit and the second travel distance calculation unit depending on the road environment, and hence, it is possible to accurately calculate the travel distance of a vehicle.

According to a second aspect of the present invention, the first travel distance calculation unit may be configured to match the position information on the vehicle with map information to identify which road in the map information includes a position indicated by the position information on the vehicle, and the calculation-means selecting unit may be configured to select the calculation means on the basis of information on the road identified by the first travel distance calculation unit.

This enables the calculation means for the travel distance to be appropriately switched depending on a road on which the vehicle travels.

According to a third aspect of the present invention, the calculation-means selecting unit may be configured to select the first travel distance calculation unit in a case where the road that is identified is determined to be a road for which accurate position information is provided.

This causes the first travel distance calculation unit to calculate the travel distance in a case where a road on which the vehicle travels meets a condition where accurate position information is provided for the road, and hence, it is possible to calculate a more accurate travel distance.

According to a fourth aspect of the present invention, the calculation-means selecting unit may be further configured to select the first travel distance calculation unit in a case where the state of communication is favorable.

This causes the first travel distance calculation unit to calculate the travel distance in a case where a road on which the vehicle travels meets a condition where accurate position information on the vehicle can be obtained using a GNSS satellite, and hence, it is possible to calculate a more accurate travel distance.

According to a fifth aspect of the present invention, the calculation-means selecting unit may be configured to select the second travel distance calculation unit in a case where it is determined that the road that is identified is not a road for which accurate position information is provided or in a case where the state of communication is not favorable.

This causes the second travel distance calculation unit to calculate the travel distance according to the condition described above in a case where the road on which the vehicle travels meets such a condition, and hence, it is possible to calculate an accurate travel distance according to the road environment.

According to a sixth aspect of the present invention, the travel distance calculation device may further include a correction factor calculation unit (14) configured to calculate a correction factor for correcting the travel distance based on the number of rotations of a tire, the correction factor being calculated on the basis of a relationship between the travel distance calculated by the first travel distance calculation unit and the travel distance based on the number of rotations of a tire. The second travel distance calculation unit may be configured to correct the travel distance based on the number of rotations of a tire using the correction factor calculated by the correction factor calculation unit.

With the correction factor calculation unit being provided, it is possible to correct the travel distance based on the number of rotations of a tire, and hence, the second travel distance calculation unit can calculate a more accurate travel distance.

According to a seventh aspect of the present invention, the correction factor calculation unit may be configured to calculate the correction factor according to a road condition.

The correction factor according to the condition of roads can be calculated, and hence, the second travel distance calculation unit can calculate a more accurate travel distance.

According to an eighth aspect of the present invention, the travel distance calculation device may further include a road condition determination unit (15) configured to determine a road condition of a road on which the vehicle travels on the basis of attitude information on the vehicle. The second travel distance calculation unit may be configured to select a correction factor according to the road condition determined by the road condition determination unit from among the correction factor, and calculate the travel distance using the correction factor that is selected.

The correction factor according to the road condition can be selected to calculate the travel distance, and hence, the second travel distance calculation unit can calculate a more accurate travel distance.

According to a ninth aspect of the present invention, in a case where the vehicle travels on a road for which accurate position information is determined to be provided and the state of communication is favorable, the correction factor calculation unit may be configured to record the travel distance calculated by the first travel distance calculation unit in a case that the vehicle travels on the road and the travel distance based on the number of rotations of a tire.

This enables the correction factor based on the travel distance calculated by the first travel distance calculation unit to be calculated by comparing the travel distance calculated by the first travel distance calculation unit when the same road is traveled with the travel distance based on the number of rotations of a tire, and hence, it is possible to make the accuracy of the travel distance calculated by the second travel distance calculation unit close to the calculation accuracy of the travel distance by the first travel distance calculation unit.

According to a tenth aspect of the present invention, the correction factor calculation unit may be further configured to associate attitude information on a vehicle that travels on the road with the correction factor that is calculated to record the attitude information and the correction factor.

This enables a correction factor to be selected for each piece of attitude information on a vehicle, and hence, the second travel distance calculation unit can calculate a more accurate travel distance.

According to an eleventh aspect of the present invention, the travel distance calculation device may further include a travel distance identification unit (17) configured to identify a travel distance of the vehicle for each charge applicable section.

The travel distance of a vehicle is calculated for each charge applicable section, and hence, it is possible to calculate the charged toll for each charge applicable section even in a case where the vehicle travels across a plurality of road sections with different charging methods.

According to a twelfth aspect of the present invention, the travel distance identification unit may be configured to identify a travel distance by excluding a travel distance of a vehicle in a toll-free road.

Even in a case where the vehicle travels on a toll-free road (for example, a private road), the travel distance in this section is not identified, and hence, it is possible to avoid mistakenly including the travel distance in the toll-free road in the travel distance to be charged.

According to a thirteenth aspect of the present invention, a charging system (1) includes:

the travel distance calculation device described above, and a charge processing device (21) configured to perform charge processing on the basis of a travel distance calculated by the travel distance calculation device.

This enables charge processing to be performed according to the travel distance of a vehicle.

According to a fourteenth aspect of the present invention, a travel distance calculation method includes selecting calculation means configured to calculate a travel distance of a vehicle, from among means configured to calculate the travel distance of the vehicle on the basis of position information on the vehicle obtained through position determination using a GNSS satellite, and means configured to calculate a travel distance of the vehicle on the basis of the number of rotations of a tire that the vehicle includes, on the basis of at least one of the position information on the vehicle obtained through position determination using the GNSS satellite and information indicating a state of communication with the GNSS satellite.

According to a fifteenth aspect of the present invention, a program causes a computer that a travel distance calculation device includes to function as:

first means configured to calculate a travel distance of a vehicle on the basis of position information on the vehicle obtained through position determination using a GNSS satellite;

second means configured to calculate a travel distance of the vehicle on the basis of the number of rotations of a tire that the vehicle includes; and means configured to select calculation means configured to calculate the travel distance of the vehicle from among the first means and the second means, on the basis of at least one of the position information on the vehicle obtained through position determination using the GNSS satellite and information indicating a state of communication with the GNSS satellite.

According to a sixteenth aspect of the present invention, a storage medium that stores a program for causing a computer that a travel distance calculation device includes to function as:

first means configured to calculate a travel distance of a vehicle on the basis of position information on the vehicle obtained through position determination using a GNSS satellite;

second means configured to calculate a travel distance of the vehicle on the basis of the number of rotations of a tire that the vehicle includes; and means configured to select calculation means configured to calculate the travel distance of the vehicle from among the first means and the second means, on the basis of at least one of the position information on the vehicle obtained through position determination using the GNSS satellite and information indicating a state of communication with the GNSS satellite.

Advantageous Effect of Invention

The travel distance calculation device, the travel distance calculation method, the program, and the storage medium described above enable the travel distance of a vehicle to be calculated in an accurate manner by selecting calculation means for a travel distance according to road environments.

DESCRIPTION OF EMBODIMENTS

Embodiment

The following will describe a method for measuring a travel distance of a vehicle and charge processing based on the travel distance according to an embodiment of the present invention with reference to FIGS. 1 to 7.

Overall Configuration

Figure 1:
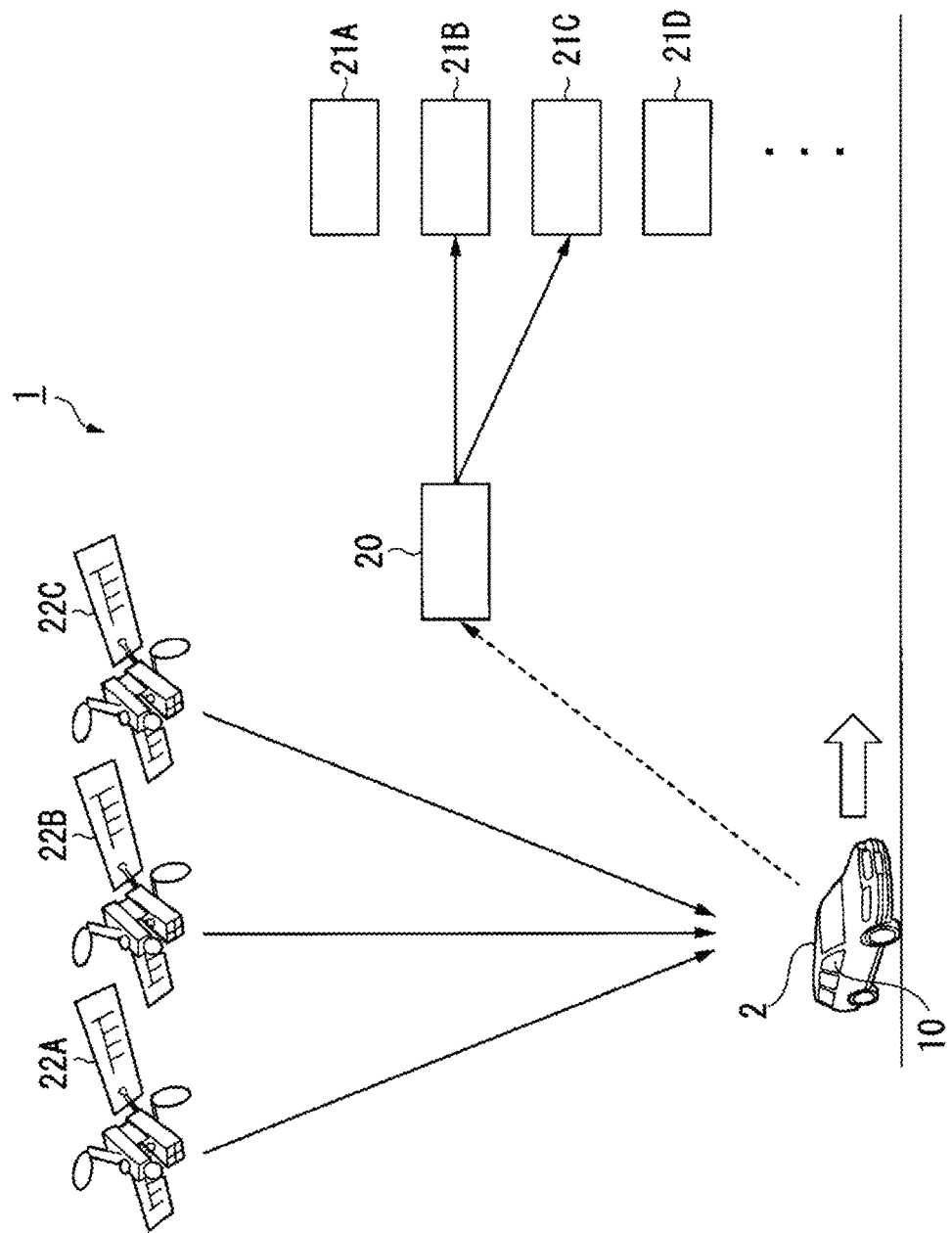
FIG. 1 is a schematic view illustrating an example of a charging system according to an embodiment of the present invention.

FIG. 1 is a schematic diagram illustrating an example of a charging system according to an embodiment of the present invention.

A charging system 1 is a system that charges a toll, according to a travel distance of the vehicle, to a vehicle that travels on a road. As illustrated in FIG. 1, the charging system 1 includes a travel distance calculation device 10 mounted on a vehicle 2, a central system 20, a charge processing device 21A, a charge processing device 21B, a charge processing device 21C, and a charge processing device 21D.

The travel distance calculation device 10 is a device configured to calculate a travel distance of a vehicle 2. The travel distance calculation device 10 is connected to individual sensors that the vehicle 2 includes, and calculates a travel distance of the vehicle 2 using measured values measured with the individual sensors. For example, the travel distance calculation device 10 is connected to a GNSS receiver (not illustrated) and obtains, through the GNSS receiver, position information on the vehicle 2 for which the GNSS satellites 22A, 22B, 22C perform position determination. The travel distance calculation device 10 matches the obtained position information on the vehicle 2 with map information to perform map matching for identifying a road on which the vehicle 2 travels and a travel section in the road in which the vehicle 2 travels. The travel distance calculation device 10 calculates the travel distance of the vehicle 2 using information concerning the identified road and the travel section. The travel distance calculation device 10 is connected to the central system 20 through a network in a communicable manner. The travel distance calculation device 10 sends information on the calculated travel distance to the central system 20.

The central system 20 is connected to the travel distance calculation device 10 and the charge processing devices 21A, 21B, 21C, 21D through a network in a communicable manner. The central system 20 obtains, from the travel distance calculation device 10, information on the travel distance of the vehicle 2 calculated by the travel distance calculation device 10. The central system 20 sends information on the travel distance of the vehicle 2, for example, to the charge processing device 21A or the like. The method for calculating a charged toll and the collector/receiver of the charged toll differ depending on charge applicable sections. In connection with each section in which the vehicle 2 travels, the central system 20 sends information on the travel distance in each of the charge applicable sections, to the respective charge processing devices 21A to 21D, each of which is associated with the corresponding charge applicable section that includes the sections.

The charge processing devices 21A to 21D are connected to the central system 20 through a network in a communicable manner. The charge processing devices 21A to 21D receive information on a travel distance of the vehicle 2 from the central system 20, and calculate, on the basis of the travel distance, a charged toll charged to the vehicle 2. The charge processing devices 21A to 21D perform a process for settling the charged toll calculated for the vehicle 2.

Note that the charge processing devices 21A to 21D are collectively referred to as a charge processing device 21. In addition, the GNSS satellites 22A, 22B, and 22C are collectively referred to as a GNSS satellite 22. Only one travel distance calculation device 10 and one central system 20 are illustrated in FIG. 1. However, a plurality of travel distance calculation devices 10 and a plurality of central systems 20 may be provided. In addition, the number of the charge processing devices 21 may not be four. The number of the GNSS satellites 22 may not be three. For example, the number of the GNSS satellites 22 may be four or more.

Functional Configuration of Travel Distance Calculation Device

Figure 2:
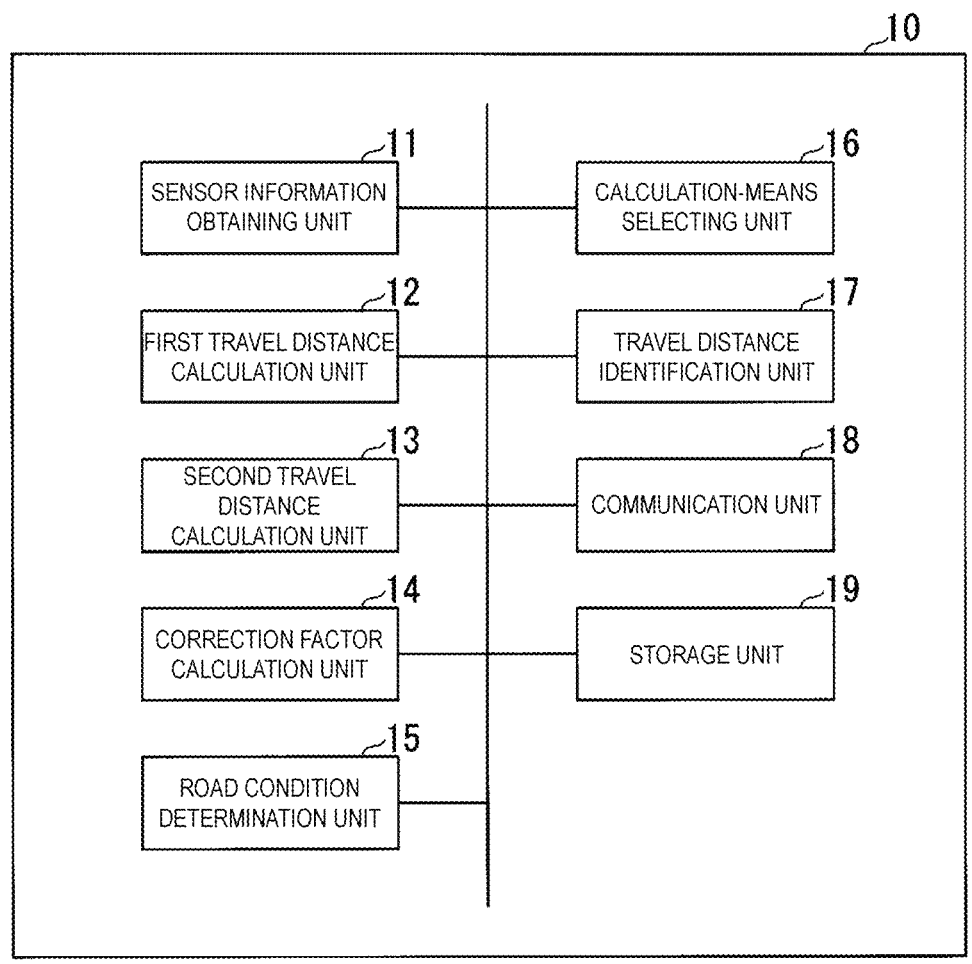
FIG. 2 is a block diagram illustrating an example of a travel distance calculation device according to the embodiment of the present invention.

FIG. 2 is a block diagram illustrating an example of the travel distance calculation device according to the embodiment of the present invention.

As illustrated in FIG. 2, the travel distance calculation device 10 includes a sensor information obtaining unit 11, a first travel distance calculation unit 12, a second travel distance calculation unit 13, a correction factor calculation unit 14, a road condition determination unit 15, a calculation-means selecting unit 16, a travel distance identification unit 17, a communication unit 18, and a storage unit 19.

The sensor information obtaining unit 11 obtains, from individual sensors, information (referred to as sensor information) used to calculate the travel distance of the vehicle 2. For example, the sensor information obtaining unit 11 receives, through the GNSS receiver that the vehicle 2 includes, signals containing position information transmitted from the GNSS satellite 22. In addition, for example, the sensor information obtaining unit 11 obtains a change in traveling speed of the vehicle 2 and attitude information on the vehicle 2 from an inertial sensor that the vehicle 2 includes. Examples of the inertial sensor include an accelerometer and a 3-axis gyro sensor. In addition, the attitude information represents, for example, an angular velocity and an inclination angle when the vehicle 2 changes its travel direction.

The first travel distance calculation unit 12 calculates the travel distance of the vehicle 2 on the basis of the sensor information obtained by the sensor information obtaining unit 11 and map information. For example, the first travel distance calculation unit 12 performs map matching using the map information and the position information on the vehicle 2 obtained by the sensor information obtaining unit 11 using the GNSS satellite, and identifies a road on which the vehicle 2 travels and a travel section in the road. The first travel distance calculation unit 12 computes the distance (road length) of the travel section in the identified road contained in the map information, and calculates the travel distance of the vehicle 2. Note that, in a situation in which signals from the GNSS satellite 22 cannot be received, for example, at the time of traveling in a tunnel on a highway, the first travel distance calculation unit 12 may calculate the position information on the vehicle 2 through an autonomous navigation method using measured values of the inertial sensor obtained by the sensor information obtaining unit 11. The travel distance calculated by the first travel distance calculation unit 12 is referred to as a first travel distance.

The second travel distance calculation unit 13 calculates the travel distance of the vehicle 2 on the basis of a measured value using the odometer that the vehicle 2 includes. The odometer is a measuring unit that measures a travel distance on the basis of the number of rotations of a tire of the vehicle 2. For example, the odometer measures the travel distance by multiplying the number of rotations of a tire of the vehicle 2 by the travel distance per rotation of the tire. The second travel distance calculation unit 13 calculates the travel distance of the vehicle 2 on the basis of the measured value using this odometer. For example, the second travel distance calculation unit 13 uses, as the travel distance of the vehicle 2, the travel distance based on the measured value using the odometer. In addition, for example, the second travel distance calculation unit 13 calculates the travel distance by using a correction factor, which will be described later, for correcting the travel distance based on the measured value using the odometer. By making correction using the correction factor, it is possible to correct the travel distance based on the number of rotations of a tire, and hence, the second travel distance calculation unit 13 can calculate a more accurate travel distance. Note that the travel distance calculated by the second travel distance calculation unit 13 is referred to as a second travel distance.

The correction factor calculation unit 14 calculates a correction factor for correcting a travel distance (travel distance obtained using the odometer) based on the number of rotations of a tire, the correction factor being calculated on the basis of a relationship between the first travel distance calculated by the first travel distance calculation unit 12 and the travel distance based on the number of rotations of a tire and calculated by the second travel distance calculation unit 13. The size of and the air pressure of the tire varies depending on vehicles. In addition, a tire wears and the air pressure thereof varies during the time when the vehicle 2 travels. Thus, the travel distance of the vehicle 2 per rotation of a tire varies even for the same vehicle 2. The correction factor calculation unit 14 takes the first travel distance obtained by the first travel distance calculation unit 12 as a correct value, and calculates a correction factor for correcting the travel distance obtained using the odometer. Note that the correction factor calculation unit 14 may calculate the correction factor for each condition of a road. Examples of the condition of a road include the shape of the road (straight or curved), the gradient (uphill road or downhill road), and the surface condition (icy road and the like).

The road condition determination unit 15 determines, on the basis of the map information, the road condition in which the vehicle 2 travels. The "road condition" includes a state such as the shape of and the gradient of the road. Alternatively, the road condition determination unit 15 determines the road condition, for example, as to whether the road is slippery, on the basis of weather information and road conditions provided by a transport agency.

The calculation-means selecting unit 16 selects calculation means that calculates the travel distance of the vehicle 2 from among the first travel distance calculation unit 12 and the second travel distance calculation unit 13 on the basis of at least one of the position information on the vehicle 2 obtained through position determination using the GNSS satellite 22 and information indicating a state of communication with the GNSS satellite 22. For example, the calculation-means selecting unit 16 selects the first travel distance calculation unit 12 in a case where the position information on the vehicle 2 obtained using the GNSS satellite 22 indicates that the vehicle 2 exists on a highway. Furthermore, for example, the calculation-means selecting unit 16 selects the second travel distance calculation unit 13 in a case where the position information on the vehicle 2 obtained using the GNSS satellite 22 indicates that the vehicle 2 exists on a general road. In addition, for example, the calculation-means selecting unit 16 selects the first travel distance calculation unit 12 in a case where the state of communication with the GNSS satellite 22 is favorable, and selects the second travel distance calculation unit 13 in a case where the state of communication is not favorable.

The travel distance identification unit 17 identifies the travel distance of the vehicle 2 for each charge applicable section. The charge applicable section represents a section in a road managed by one certain charging body. Different charge applicable sections may have different charged-toll calculation methods. In a case where the vehicle 2 travels in a charge applicable section, a charging body that manages the charge applicable section collects a charged toll calculated according to the travel distance in which the vehicle 2 travels in the charge applicable section. The travel distance identification unit 17 identifies the travel distance of the vehicle 2 for each of the charge applicable sections managed by different charging bodies.

The communication unit 18 makes data communication between the device itself and another device through a network. For example, the communication unit 18 sends the travel distance identified by the travel distance identification unit 17 to the central system 20. In addition, for example, the communication unit 18 receives the latest map information used for map matching.

The storage unit 19 stores, for example, the map information received by the communication unit 18, and the correction factor calculated by the correction factor calculation unit 14.

Outline of Method for Calculating Travel Distance

Figure 3:
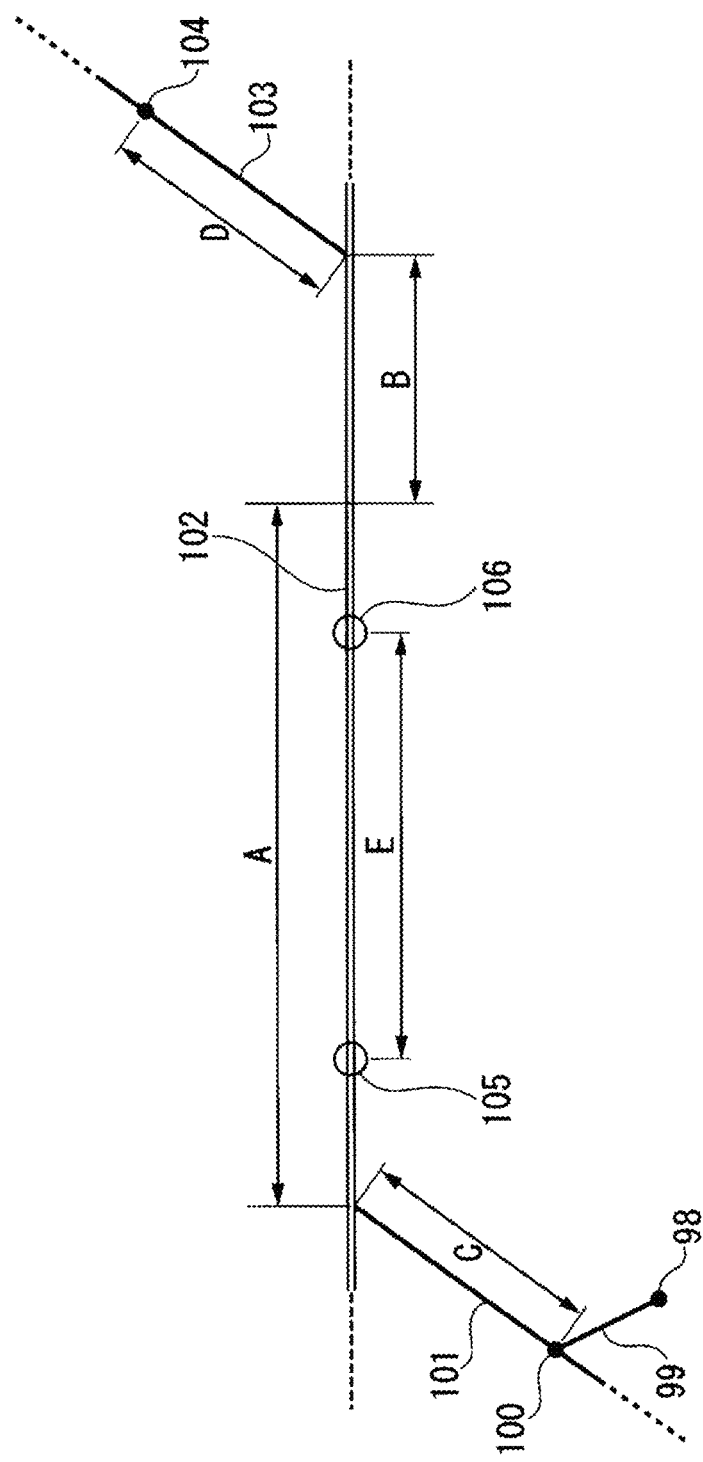
FIG. 3 is an explanatory diagram illustrating an example of a method for calculating a travel distance according to the embodiment of the present invention.

FIG. 3 is an explanatory diagram illustrating an example of a method for calculating a travel distance according to the embodiment of the present invention.

With reference to FIG. 3, a description will be made of a method for calculating a travel distance performed by the travel distance calculation device 10 in the case where the vehicle 2 travels from the position 98 to the position 104. In FIG. 3, the road 99 is a private road. The road 101 and the road 103 are general roads, and the road 102 is a highway. The position 98 is included in the road 99. The position 100 is included in the road 101, and the position 104 is included in the road 103. In addition, the charge applicable section C in the road 101 is managed by a municipality c, and in a case where the vehicle 2 travels in the charge applicable section C, the municipality c charges for the travel. The charge applicable section A in the road 102 is managed by a company a, and in a case where the vehicle 2 travels in the charge applicable section A, the company a charges for the travel. The charge applicable section B in the road 102 is managed by a company b, and in a case where the vehicle 2 travels in the charge applicable section B, the company b charges for the travel. The charge applicable section D in the road 103 is managed by a municipality d, and in a case where the vehicle 2 travels in the charge applicable section D, the municipality d charges for the travel. Note that, since the road 99 is a private road, no charge is made in a case where the vehicle 2 travels on the road 99.

The travel distance calculation device 10 calculates the travel distance in connection with charge. Thus, the travel distance calculation device 10 does not calculate the travel distance of the vehicle 2 in the road 99, and does calculate the travel distance of the vehicle 2 in the road 101, the road 102, and the road 103. In addition, since the charging body differs among the charge applicable section C in the road 101, the charge applicable section A in the road 102, the charge applicable section B in the road 102, and the charge applicable section D in the road 103, the travel distance calculation device 10 calculates the travel distance for each of the charge applicable section A to the charge applicable section D.

The charge applicable section A and the charge applicable section B are sections that form part of the highway. Generally, the state of reception from the GNSS satellite is favorable in highways, and accurate map information in which accurate position information is reflected is provided for highways. In the case where these conditions described above are met, the position information on the vehicle 2 obtained using the GNSS satellite is precise, and hence, it is possible to precisely perform map matching using the accurate position information and the accurate map information. In addition, it is possible to precisely calculate the travel distance of the vehicle 2 using the accurate map information. Thus, the calculation-means selecting unit 16 selects the first travel distance calculation unit 12 as the calculation means for travel distances of the charge applicable section A and the charge applicable section B, on the basis of the fact that the road indicated by the position information on the vehicle 2 obtained through position determination using the GNSS satellite 22 is a highway. Note that the case that the calculation-means selecting unit 16 selects the first travel distance calculation unit 12 is not limited to when the road on which the vehicle 2 travels is a highway. For example, the calculation-means selecting unit 16 may select the first travel distance calculation unit 12 on the basis of the fact that the state of communication with the GNSS satellite 22 is favorable and the road indicated by the position information on the vehicle 2 obtained using the GNSS satellite 22 is a road for which accurate position information is provided. Another example of a road for which state of communication with the GNSS satellite 22 is favorable and accurate position information can be obtained includes national highways and main roads. Note that the "state of communication with the GNSS satellite 22 is favorable" means that communication can be made with three or more (desirably, four or more) GNSS satellites 22.

The charge applicable section C and the charge applicable section D are sections that each form part of a general road. In general roads within an urban area or between cities, the state of reception from the GNSS satellite may not be favorable because high-rise buildings reflect or block signals from the GNSS satellites. In addition, unlike highways or main roads, general roads are not provided with map information in which the latest position information on roads are reflected. Thus, at the time of calculating the travel distance of the vehicle 2 using map matching, the exact road may not be identified because accurate position information cannot be obtained. In addition, at the time of calculating the distance of the identified road, the accurate travel distance may not be obtained because the map information is not correct. In such a case, the calculation-means selecting unit 16 selects the second travel distance calculation unit 13 as the calculation means for travel distances of the charge applicable section C and the charge applicable section D, on the basis of the fact that the road indicated by the position information on the vehicle obtained by using the GNSS satellite 22 is not a highway, a main road, or the like.

Note that the case the calculation-means selecting unit 16 selects the second travel distance calculation unit 13 is not limited to the case where the road on which the vehicle 2 travels is not a highway or the like. The calculation-means selecting unit 16 may select the second travel distance calculation unit 13 on the basis of the fact that the state of communication with the GNSS satellite 22 is not favorable or the fact that the position indicated by the position information on the vehicle 2 is in a road for which accurate position information may not be obtained. For example, even in the case where the vehicle 2 is determined to exist on a highway as a result of position determination using the GNSS satellite 22, in a case that communication can be made only with two GNSS satellites 22, the calculation-means selecting unit 16 may select the second travel distance calculation unit 13 on the basis of the fact that the state of communication with the GNSS satellites 22 is not favorable. Alternatively, even in the case where communication can be made with four GNSS satellites, in a case that the vehicle 2 is indicated to exist on a general road as a result of position determination using the GNSS satellites 22, the calculation-means selecting unit 16 selects the second travel distance calculation unit 13 on the basis of the fact that accurate position information may not be provided for the general road.

As described above, in the present embodiment, it is assumed that the travel distance calculated through map matching on the basis of the position information on the vehicle 2 obtained using the GNSS satellite 22 and the map information is relatively accurate, and the travel distance of the vehicle 2 is calculated using the first travel distance calculation unit 12 for charge applicable sections that meet the conditions for using this calculation method. In addition, in a case of charge applicable sections that do not meet the conditions, a calculation method is switched to the calculation method using the second travel distance calculation unit 13 to calculate the travel distance of the vehicle 2. In the case of FIG. 3, as the vehicle 2 travels, the calculation-means selecting unit 16: selects the second travel distance calculation unit 13 to calculate the travel distance for the charge applicable section C, which is a general road; selects the first travel distance calculation unit 12 to calculate the travel distance for the charge applicable section A and the charge applicable section B, which are highways; and selects the second travel distance calculation unit 13 again to calculate the travel distance for the charge applicable section D, which is a general road.

Outline of Method for Calculating Correction Factor

Next, a method for calculating a correction factor will be described. The second travel distance calculation unit 13 uses a correction factor calculated by the correction factor calculation unit 14 to correct the travel distance measured with the odometer, and calculate the second travel distance. In the case of FIG. 3, the correction factor calculation unit 14 uses the first travel distance calculated for the section E by the first travel distance calculation unit 12 and the travel distance measured for the section E with the odometer to calculate the correction factor. More specifically, the correction factor calculation unit 14 divides the first travel distance by the travel distance measured with the odometer to calculate a ratio of the first travel distance relative to the travel distance measured with the odometer, and sets the calculated value as the correction factor. For example, in the case where the vehicle 2 travels in the charge applicable section D, the second travel distance calculation unit 13 multiplies the travel distance measured with the odometer by the correction factor calculated for the section E, thereby calculating the second travel distance.

The correction factor is calculated on the assumption that the first travel distance is a correct value, and hence, the correction factor calculation unit 14 calculates the correction factor in a situation where the first travel distance calculation unit 12 can calculate the first travel distance. More specifically, the correction factor calculation unit 14 calculates the correction factor in the case where the traveling position of the vehicle 2 obtained using the GNSS satellite 22 is in a correction-factor calculation section set in advance, or the case where information (for example, the number of GNSS satellites 22 that can be communicated) indicating the state of communication with the GNSS satellite 22 is favorable (for example, the number of the GNSS satellites 22 that can be communicated is three or more), and accurate position information is given for the road. The correction-factor calculation section represents a section, for example, of part of a highway, in which the state of communication with the GNSS satellites 22 is favorable and accurate position information is provided. The correction factor calculation unit 14 records, in the storage unit 19, the first travel distance measured in the correction-factor calculation section and the travel distance obtained using the odometer. The correction factor calculation unit 14 uses these recorded travel distances to calculate the correction factor. Note that, to calculate the accurate correction factor, the first travel distance and the travel distance obtained using the odometer may be recorded only in the case where such a condition that the vehicle 2 constantly travels in a stable manner is further met. The case "constantly travels in a stable manner" means, for example, a case where a vehicle travels at a predetermined speed or greater for a predetermined period of time or longer in a straight travel section on, for example, a highway.

The correction factor varies depending on the air pressure or degree of wear of a tire, and hence, it is preferable to calculate the correction factor according to the current condition of the tire as much as possible. Thus, the correction factor calculation unit 14 calculates the correction factor every time a vehicle travels in the correction-factor calculation section. Alternatively, for example, in the case where the vehicle does not travel in a correction-factor calculation section for a predetermined period of time or longer and the state of communication with the GNSS satellite 22 is favorable in a travel section in which accurate position information (accurate map information) is provided for the road, the correction factor calculation unit 14 may record the first travel distance and the travel distance obtained using the odometer in part of the travel section, and calculate the correction factor. For example, in the case where the vehicle 2 travels in a general road in an urban area, the second travel distance calculation unit 13 calculates the second travel distance using the latest correction factor.

Correction Factor Calculation: in the Case of Curved Road

Next, a method for calculating a correction factor according to conditions of a road will be described.

The correction factor calculation unit 14 calculates the correction factor using the first travel distance and the travel distance obtained using the odometer when a vehicle travels on a straight road under an environment where the state of communication with the GNSS satellite is favorable, for example, and accurate map information is provided, such as on a highway. In addition, as long as this condition is met, the correction factor calculation unit 14 may calculate the correction factor in the case where a vehicle travels on a road under the following road conditions other than the straight road.

Figure 4A:
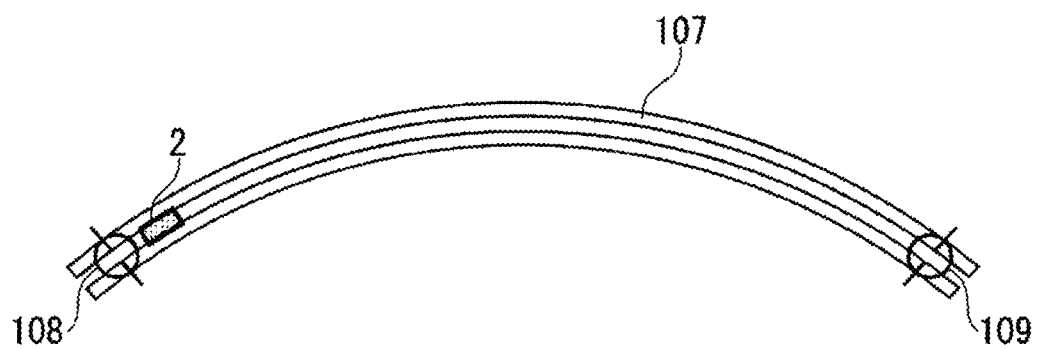
FIG. 4A is a first diagram illustrating an example of a method for calculating a correction factor for a travel distance according to the embodiment of the present invention.

FIG. 4A is a first diagram illustrating an example of a method for calculating a correction factor for a travel distance according to the embodiment of the present invention.

FIG. 4A is a diagram illustrating a certain road 107 as viewed from above. FIG. 4A illustrates that the vehicle 2 travels through the position 108 toward the position 109. As compared with the case where a vehicle travels on the straight road, in the case where a vehicle travels on a curved road as illustrated in the drawing, the travel distance differs between the tire on the inner side of the curve and the tire on the outer side, which leads to a difference in the travel distances obtained using the odometer. Thus, the correction factor calculation unit 14 may also calculate a correction factor used for traveling on a curved road, separately from the correction factor for correcting the travel distance obtained using the odometer when a vehicle travels on a straight road. A method for calculating a correction factor is similar to that described above. For example, a correction-factor calculation section for calculating a correction factor for a curve on a highway is set in advance. In the example illustrated in FIG. 4A, the correction-factor calculation section extends from the starting position (position 108) of the curve to the ending position (position 109). The correction factor calculation unit 14 records, in the storage unit 19, the first travel distance calculated by the first travel distance calculation unit 12 and extending from the position 108 to the position 109 in the road 107 based on the map information. In addition, the correction factor calculation unit 14 records, in the storage unit 19, the travel distance measured using the odometer during the time when the vehicle 2 travels from the position 108 to the position 109. The correction factor calculation unit 14 divides the first travel distance by the travel distance obtained using the odometer to calculate the correction factor. In addition, the correction factor calculation unit 14 obtains, through the sensor information obtaining unit 11, a measured value from the inertial sensor when the vehicle 2 travels from the position 108 to the position 109. The correction factor calculation unit 14 associates the angular velocity measured using the inertial sensor when a vehicle travels in this correction-factor calculation section with the correction factor to record them in the storage unit 19. Note that the correction-factor calculation section may be set in advance, or it may be possible that, during the time when the vehicle 2 travels, the road condition determination unit 15 detects that a vehicle travels on a curved road on the basis of the measured value using the inertial sensor, and the correction factor calculation unit 14 calculates the correction factor for that case. In addition, as the angular velocity, measured values of the angular velocity measured at each predetermined interval may be recorded, or a representative value (average value or median value) of angular velocities measured in a predetermined period of time may be recorded. Since the correction factor calculation unit 14 calculates and records the correction factor according to the condition of a road, the second travel distance calculation unit 13 can calculate a more accurate travel distance.

Next, an example of a method for correcting a travel distance using the calculated correction factor will be described. For example, it is assumed that the vehicle 2 travels in a single charge applicable section in a general road in which a straight road and a curved road are mixed. The calculation-means selecting unit 16 selects the second travel distance calculation unit 13 to calculate the travel distance, for example, on the basis of the fact that the state of communication with the GNSS satellite is not favorable.

During the time when the vehicle 2 travels on a road in an urban area, the road condition determination unit 15 determines the shape of the road on which the vehicle 2 travels, on the basis of angular velocities measured using the inertial sensor. For example, upon detection of a predetermined angular velocity for a predetermined period of time or longer, the road condition determination unit 15 determines that the vehicle 2 travels on a curved road. The road condition determination unit 15 outputs the determination results and the angular velocities to the second travel distance calculation unit 13. The second travel distance calculation unit 13 selects an angular velocity from among angular velocities that have been associated with the correction factor and recorded in the storage unit 19. Here, a difference between the selected angular velocity and the obtained angular velocity is within a predetermined range, and the value of the selected angular velocity is closest to that of the obtained angular velocity. The second travel distance calculation unit 13 reads the correction factor associated with the selected angular velocity from the storage unit 19, and multiplies the read correction factor by the travel distance obtained using the odometer to calculate the second travel distance. In addition, in a range where the vehicle 2 is presumed to travel on a straight road on the basis of the measured values from the inertial sensor obtained by the sensor information obtaining unit 11, the second travel distance calculation unit 13 reads a normal correction factor (for a straight road) from the storage unit 19, and uses this correction factor to calculate the second travel distance in the straight road. The second travel distance calculation unit 13 adds the calculated second travel distances together to obtain the total value of the travel distances in the travel section.

Correction Factor Calculation: in the Case of Slope Road

Figure 4B:
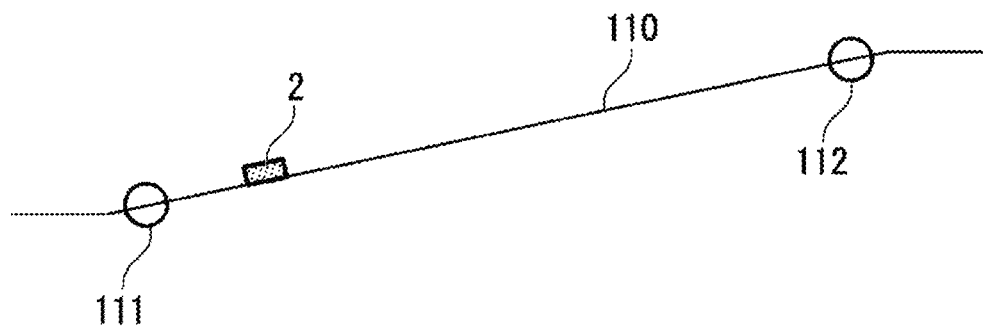
FIG. 4B is a second diagram illustrating an example of a method for calculating a correction factor for a travel distance according to the embodiment of the present invention.

FIG. 4B is a second diagram illustrating an example of a method for calculating a correction factor for a travel distance according to the embodiment of the present invention.

FIG. 4B is a cross-sectional view illustrating a certain road 110. FIG. 4B illustrates that the vehicle 2 passes through the position 111, goes up a slope road, and travels toward the position 112. In the case where the vehicle 2 travels on a slope road, the travel distance obtained using the odometer may differ from that on a level road even in a case where a vehicle travels in the same distance. Thus, the correction factor calculation unit 14 may also calculate a correction factor used for traveling on an uphill road and a correction factor used for traveling on a downhill road, separately from the correction factor used when a vehicle travels a level road. For example, a correction-factor calculation section for calculating a correction factor for a slope road on a highway is set in advance. In the example illustrated in FIG. 4B, the correction-factor calculation section extends from the starting position (position 111) of the uphill road to the ending position (position 112). The correction factor calculation unit 14 records, in the storage unit 19, the first travel distance calculated by the first travel distance calculation unit 12 and extending from the position 111 to the position 112 in the road 110 based on the map information. In addition, the correction factor calculation unit 14 records, in the storage unit 19, the travel distance measured using the odometer during the time when the vehicle 2 travels from the position 111 to the position 112. The correction factor calculation unit 14 divides the first travel distance in the uphill road by the travel distance in the uphill road obtained using the odometer to calculate the correction factor. In addition, the correction factor calculation unit 14 obtains, through the sensor information obtaining unit 11, an inclination angle of the vehicle 2 measured using the inertial sensor when the vehicle 2 travels from the position 111 to the position 112. For example, the correction factor calculation unit 14 associates the inclination angle of the vehicle 2 in the vertical direction with the correction factor to record them in the storage unit 19. The correction factor calculation unit 14 similarly calculates the correction factor for the downhill road and associates the inclination angle of the vehicle 2 in the downhill road in the vertical direction with the correction factor to record them in the storage unit 19. Note that the correction-factor calculation section may be set in advance, or it may be possible that, during the time when the vehicle 2 travels, the road condition determination unit 15 detects that the vehicle 2 travels on a slope road on the basis of the measured value using the inertial sensor, and the correction factor calculation unit 14 calculates the correction factor for the slope road. In addition, as the inclination angle, measured values of the inclination angles measured at each predetermined interval may be recorded, or a representative value (average value or median value) of inclination angles measured in a predetermined period of time may be recorded.

Next, an example of the correction method using the calculated correction factor will be described. For example, it is assumed that the vehicle 2 travels in a single charge applicable section in a general road in which a slope and a level road are mixed. The calculation-means selecting unit 16 selects the second travel distance calculation unit 13 to calculate the travel distance, for example, on the basis of the fact that the road indicated by the position information on the vehicle 2 based on the map information is a general road. During the time when the vehicle 2 travels on a road in an urban area, the road condition determination unit 15 determines the gradient of the road on which the vehicle 2 travels, for example, on the basis of inclination angles measured using the inertial sensor. For example, upon detection of a predetermined angle or greater for a predetermined period of time or longer, the road condition determination unit 15 determines that the vehicle 2 travels on a slope road. The road condition determination unit 15 outputs the determination results and the inclination angles to the second travel distance calculation unit 13. The second travel distance calculation unit 13 selects an inclination angle from among inclination angles that have been associated with the correction factor and recorded in the storage unit 19. Here, a difference between the selected inclination angle and the obtained inclination angle is within a predetermined range, and a value of the selected inclination angle is closest to that of the obtained inclination angle. The second travel distance calculation unit 13 reads the correction factor associated with the selected inclination angle from the storage unit 19, and multiplies the read correction factor by the travel distance obtained using the odometer to calculate the second travel distance. The correction factor selected for each attitude information on the vehicle 2 is used to make correction, and hence, the second travel distance calculation unit 13 can calculate a more accurate travel distance. In addition, in a range where the vehicle 2 is presumed to travel on a level road on the basis of the measured values using the inertial sensor obtained by the sensor information obtaining unit 11, the second travel distance calculation unit 13 reads a normal correction factor (for a straight road) from the storage unit 19, and uses this correction factor to calculate the second travel distance in the straight road. The second travel distance calculation unit 13 adds the calculated second travel distances together to obtain the total travel distance in the section.

In the example described above, the correction factor calculation unit 14 may calculate the correction factor for each degree of curvature of a curve and for each gradient of a slope road. Furthermore, in addition to the correction factor for a curved road and the correction factor for a slope road, the correction factor calculation unit 14 may also calculate a correction factor for icy road and a correction factor for each weather condition such as rain and cold/warm of the outdoor temperature. The road condition determination unit 15 obtains information on the weather condition through the communication unit 18, for example, from a web site that provides weather information, and determines whether a correction factor should be calculated for the weather condition. When the road condition determination unit 15 determines that a correction factor needs to be calculated for the weather condition, the correction factor calculation unit 14 calculates the correction factor and associates the weather condition with the correction factor to record them in the storage unit 19. In addition, for example, the road condition determination unit 15 obtains information on the condition of the road surface provided by transportation agencies through the communication unit 18, and determines whether a correction factor needs to be calculated for the condition of the road surface. When the road condition determination unit 15 determines that a correction factor should be calculated for the condition of the road surface, the correction factor calculation unit 14 calculates the correction factor and associates information on the condition of the road surface with the correction factor to record them in the storage unit 19.

In addition, the correction factor calculation unit 14 may calculate a correction factor for each speed of the vehicle 2, and associate the calculated correction factor with each speed to record them in the storage unit 19. In addition, the correction factor calculation unit 14 may calculate a correction factor for each gear stage of a transmission of the vehicle 2, and associate the calculated correction factor with each gear stage to record them in the storage unit 19.

Flow of Process of Travel Distance Calculation

Figure 5:
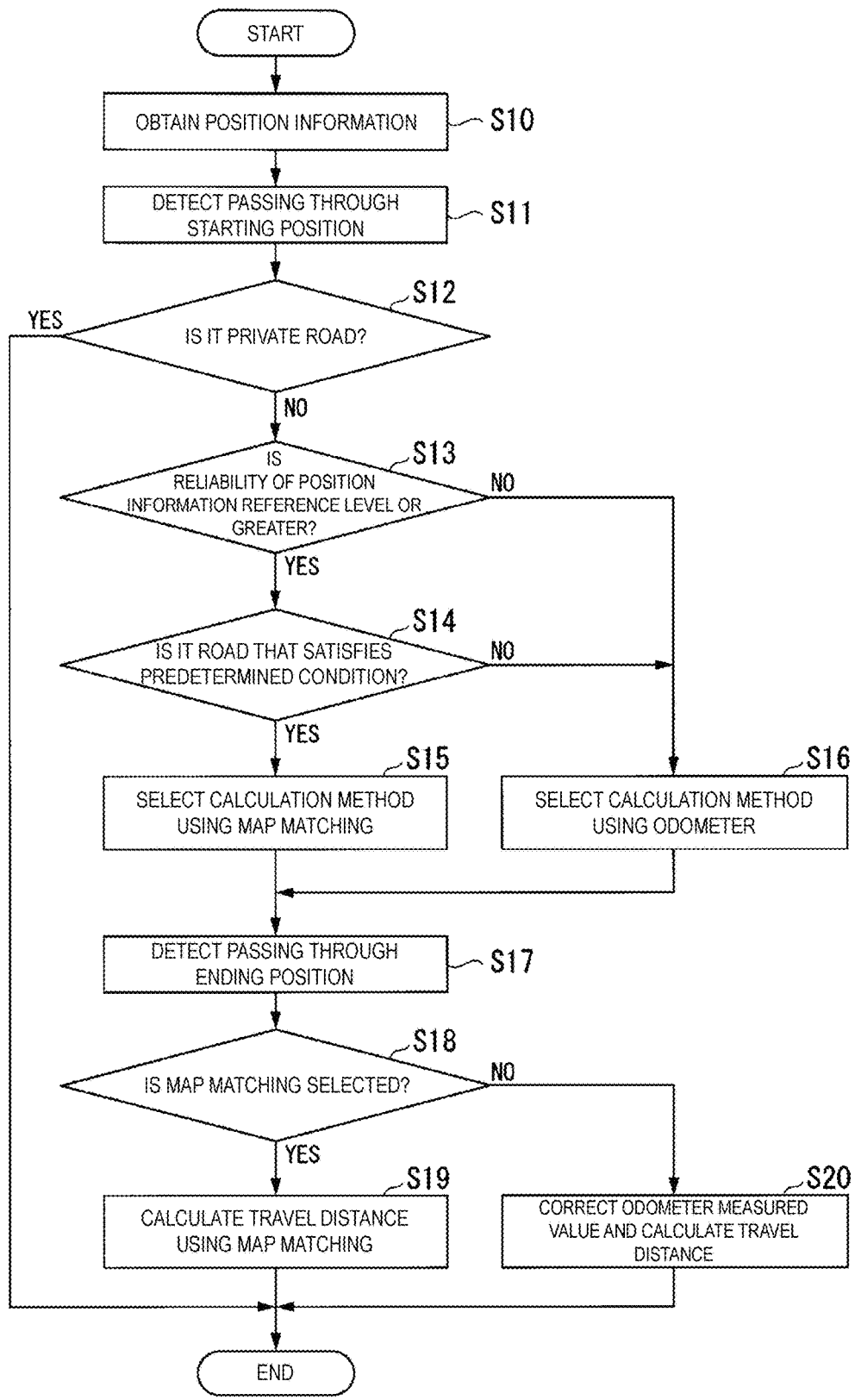
FIG. 5 is a flowchart of an example of processing for calculating a travel distance according to the embodiment of the present invention.

FIG. 5 is a flowchart of an example of processing for calculating a travel distance according to the embodiment of the present invention.

With reference to FIG. 5 and using the example in FIG. 3, a method for calculating a travel distance performed by the travel distance calculation device 10 will be described.

It is assumed that the sensor information obtaining unit 11 continuously obtains each piece of sensor information, for example, at predetermined intervals. Examples of each piece of sensor information include position information using the GNSS satellite 22, the angular velocity of the vehicle 2 and the inclination angle of the vehicle 2, which are obtained using the inertial sensor, and the like. The sensor information obtaining unit 11 records the obtained sensor information in the storage unit 19.

First, the vehicle 2 starts from the position 98. The sensor information obtaining unit 11 obtains position information from the GNSS satellite 22 (step S10), and outputs the position information to the first travel distance calculation unit 12. The first travel distance calculation unit 12 matches the position information obtained from the GNSS satellite 22 with map information stored in the storage unit 19 to identify a position where the vehicle 2 exists. At this time, in the case where the number of the GNSS satellites 22 that can communicate is two or less, the position information on the vehicle 2 may be identified using an autonomous navigation method using measured values obtained from the inertial sensor by the sensor information obtaining unit 11.

Next, the first travel distance calculation unit 12 detects that the vehicle 2 passes through a starting position of a new charge applicable section, on the basis of the identified position and the identification information on the charge applicable section (step S11). For example, identification information on the charge applicable section is set in the map information for each charge applicable section in a road, and every time when position information on the vehicle 2 is obtained, the first travel distance calculation unit 12 obtains, from the map information, identification information on the charge applicable section that includes the current position of the vehicle 2. Then, in a case where the identification information on the charge applicable section obtained this time is changed from the identification information on the charge applicable section obtained at the previous time, the first travel distance calculation unit 12 determines that passing through the starting position of the charge applicable section is detected.

Next, the first travel distance calculation unit 12 determines whether the identified position is in a private road (step S12). For example, information indicating as to whether it is a private road or a public road is set for each road in the map information, and in a case where a value set for the identified road indicates a private road, the first travel distance calculation unit 12 determines that the identified road is a private road. In a case where it is a private road (YES in step S12) as a result of determination, no charge is made to a vehicle in a private road, and hence, the travel distance calculation device 10 ends this processing flow without calculating the travel distance. In the case of the example in FIG. 3, the road 99 is a private road, and hence, the travel distance calculation device 10 does not calculate the travel distance until the vehicle 2 reaches the position 100 after starting from the position 98. In a case where the vehicle 2 reaches the position 100, then the vehicle 2 enters the road 101, which is a public road, and hence, the travel distance calculation device 10 processes the step S10 to step S12 again. At the position 100, the first travel distance calculation unit 12 determines that it is not in a private road.

In a case where it is not a private road (NO in step S12) as a result of determination, charge is to be made to a vehicle traveling on the road, and hence, the calculation-means selecting unit 16 then selects means for calculating a travel distance. First, the calculation-means selecting unit 16 determines whether the reliability of the position information using the GNSS satellite 22 is greater than or equal to a reference level (step S13). For example, the calculation-means selecting unit 16 obtains, through the sensor information obtaining unit 11, the number of GNSS satellites that can communicate with the GNSS receiver. In a case where the number of GNSS satellites 22 that can communicate is three or more, the calculation-means selecting unit 16 determines that the reliability is greater than or equal to a reference level. In addition, for example, in a case where the number of GNSS satellites 22 that communicate with the GNSS receiver is two or less, the calculation-means selecting unit 16 determines that the reliability is less than or equal to a reference level. In a case where the reliability is determined to be less than or equal to a reference level (NO in step S13), the flow proceeds to the process of step S16, which will be described later. In a case where the reliability is determined to be greater than or equal to a reference level (YES in step S13), the calculation-means selecting unit 16 determines whether the road on which the vehicle 2 currently travels is a road that satisfies a predetermined condition (step S14).

As an example of determination of predetermined conditions, the calculation-means selecting unit 16 determines whether a road on which the vehicle 2 travels is a road for which accurate position information on the road is provided. For example, the storage unit 19 records information indicating which road of the roads contained in the map information is a road for which accurate position information is provided. On the basis of this information and information on the road identified by the first travel distance calculation unit 12, the calculation-means selecting unit 16 determines that the road on which the vehicle 2 travels is the road that satisfies the condition in a case where accurate position information is provided for the road. In a case where the road on which the vehicle 2 travels is not the road for which accurate position information is provided, the calculation-means selecting unit 16 determines that this road is not the road that satisfies the condition. This determination enables the calculation means for the travel distance to be appropriately switched depending on a road on which the vehicle 2 travels.

In a case where the road is determined to satisfy the condition (YES in step S14), the calculation-means selecting unit 16 selects the calculation method using map matching as the method for calculating the travel distance in the current charge applicable section (step S15). In other words, the calculation-means selecting unit 16 determines that the travel distance is calculated by the first travel distance calculation unit 12. On the other hand, in a case where the road is not determined to satisfy the condition (NO in step S14), the calculation-means selecting unit 16 selects the calculation method using the odometer as the method for calculating the travel distance in the current charge applicable section (step S16). In other words, the calculation-means selecting unit 16 cannot calculate the travel distance using map matching because reliable position information cannot be obtained or accurate map information cannot be obtained, and hence, determines that the travel distance is calculated by the second travel distance calculation unit 13.

Determinations in step S13 and step S14 enable the appropriate calculation means for the travel distance to be selected according to the road environment (state of communication with the GNSS satellite 22 and the road indicated by position information on the vehicle 2 obtained through position determination with the GNSS satellite 22), and hence, it is possible to calculate the travel distance of a vehicle in a precise manner. For example, the travel distance is calculated by the first travel distance calculation unit 12 in a case where the road on which the vehicle 2 travels satisfies the condition where accurate position information on the vehicle 2 can be obtained with the GNSS satellite 22 and the condition where the road on which the vehicle 2 travels is the road for which accurate position information is provided, and hence, it is possible to calculate a more accurate travel distance. In addition, for example, in a case where the road on which the vehicle 2 travels does not satisfy any of the conditions described above, the travel distance is calculated by the second travel distance calculation unit 13 according to such a condition, and hence, it is possible to calculate an accurate travel distance according to the road environment.

Note that it may be possible that determinations of step S13 and step S14 are collectively performed in a case that the road is a highway, for example, and the determinations are made on the assumption that the reliability of the position information using the GNSS satellite is greater than or equal to a reference level and accurate map information is provided. For example, information indicating a road type is set for each road in the map information, and the calculation-means selecting unit 16 determines that the road on which the vehicle 2 travels is the road that satisfies the conditions in a case where the type of the road that is identified by the first travel distance calculation unit 12 and on which the vehicle 2 travels is, for example, a "highway" (determinations of step S13 and step S14 are both YES). In addition, for example, in a case where the type of the road on which the vehicle 2 travels is a "main road," the calculation-means selecting unit 16 determines that it is the road that satisfies the conditions. In these cases, the calculation-means selecting unit 16 determines that the travel distance is calculated by the first travel distance calculation unit 12. In addition, for example, in a case where the type of the road on which the vehicle 2 travels is a "general road," the calculation-means selecting unit 16 determines that it is the road that does not satisfy the conditions (either determination of step S13 or determination of step S14 is NO), and the calculation-means selecting unit 16 determines that the travel distance is calculated by the second travel distance calculation unit 13.

Next, the first travel distance calculation unit 12 detects that the vehicle 2 passes through an ending position in the charge applicable section (step S17). For example, the first travel distance calculation unit 12 obtains identification information on the charge applicable section of the road set in the map information, and determines that passing through the ending position in the charge applicable section is detected in a case where the identification information obtained this time is changed from the identification information obtained at the previous time. In a case where passing through the ending position in the charge applicable section is detected, the travel distance calculation device 10 calculates the travel distance in the charge applicable section. In a case where the calculation-means selecting unit 16 selects calculation using map matching (YES in step S18), the first travel distance calculation unit 12 calculates a travel distance (first travel distance) using map matching (step S19). For example, the first travel distance calculation unit 12 uses map matching to identify a road in the map information that matches the section in which the vehicle 2 travels as well as the section on the road. The first travel distance calculation unit 12 computes the distance on the road in the identified section. The computed distance is the travel distance in the charge applicable section including the section in which the vehicle 2 travels. The travel distance identification unit 17 associates the travel distance calculated by the first travel distance calculation unit 12 with the identification information on the charge applicable section including the traveled section, and records them in the storage unit 19.

On the other hand, in a case where the calculation-means selecting unit 16 does not select calculation using map matching (NO in step S18), the second travel distance calculation unit 13 uses the correction factor to correct the travel distance obtained using the odometer, and calculates a travel distance (second travel distance) (step S20). More specifically, the second travel distance calculation unit 13 calculates a value obtained by subtracting the measured values of the odometer at the starting position in the charge applicable section from the measured values of the odometer at the ending position in the charge applicable section. The calculated value corresponds to the travel distance obtained using the odometer and indicating the travel distance in the charge applicable section including this travel section. Note that the second travel distance calculation unit 13 may read a correction factor according to the road condition determined by the road condition determination unit 15. For example, in a case where the road condition determination unit 15 determines that the shape of the road in this travel section is a shape of a straight road on the basis of the angular velocity measured using the inertial sensor during the time when the vehicle 2 travels in this travel section, the second travel distance calculation unit 13 reads a correction factor for the straight road from the storage unit 19. Alternatively, in a case where the road condition determination unit 15 determines that the shape of the road is a curved shape, the second travel distance calculation unit 13 reads a correction factor for a curve from the storage unit 19. In addition, for example, in a case where the road condition determination unit 15 determines that the road in this travel section is a slope road on the basis of the inclination angle measured using the inertial sensor during the time when the vehicle 2 travels in this travel section, the second travel distance calculation unit 13 reads a correction factor for a slope road from the storage unit 19. The second travel distance calculation unit 13 multiplies the travel distance obtained using the odometer by the read correction factor to calculate the second travel distance. The correction factor according to the road condition can be selected to calculate the travel distance, and hence, the second travel distance calculation unit 13 can calculate a more accurate travel distance. Note that the second travel distance calculation unit 13 may take the travel distance obtained using the odometer as a second travel distance without making correction using a correction factor. The travel distance identification unit 17 associates the travel distance calculated by the second travel distance calculation unit 13 with the identification information on the charge applicable section including the traveled section, and records them in the storage unit 19. Then, the calculation processing for a travel distance in connection with one certain charge applicable section ends.

The travel distance calculation device 10 performs this processing flow every time charge applicable sections change, and calculates the travel distance. In the example in FIG. 3, after the vehicle 2 passes through the position 100, determinations of step S13 and step S14 are made. The calculation-means selecting unit 16 determines that the travel distance is calculated for the charge applicable section C by the second travel distance calculation unit 13. In addition, after the vehicle 2 enters the charge applicable section A, the second travel distance calculation unit 13 calculates a travel distance in the charge applicable section C, and the travel distance identification unit 17 records the travel distance in the storage unit 19. On the other hand, after the vehicle 2 enters the charge applicable section A, the calculation-means selecting unit 16 determines that the travel distance is calculated for the charge applicable section A by the first travel distance calculation unit 12. After the vehicle 2 enters the charge applicable section B, the first travel distance calculation unit 12 calculates a travel distance in the charge applicable section A. The same applies to the subsequent sections. In other words, the first travel distance calculation unit 12 calculates a travel distance for the charge applicable section B, and the second travel distance calculation unit 13 calculates a travel distance for the charge applicable section D. At this time, the second travel distance calculation unit 13 may use the latest correction factor calculated by the correction factor calculation unit 14 on the basis of the first travel distance in the section E and the travel distance obtained using the odometer to calculate the second travel distance in the charge applicable section D. The travel distance identification unit 17 associates information indicating a charging body of the charge applicable section with a travel distance for each charge applicable section to record them in the storage unit 19.

Flow of Process for Calculating Correction Factor

Next, with reference to FIG. 6 and using the example in FIG. 3, a flow of processing for calculating a correction factor will be described.

Figure 6:
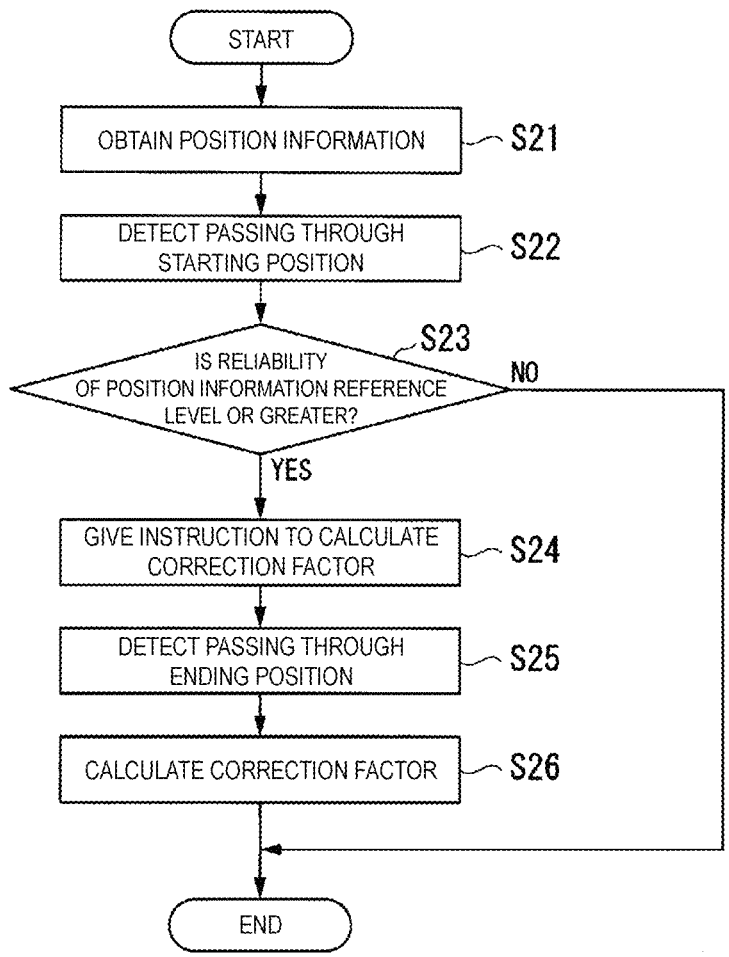
FIG. 6 is a flowchart of an example of processing for calculating a correction factor for a travel distance according to the embodiment of the present invention.

FIG. 6 is a flowchart of an example of processing for calculating a correction factor for a travel distance according to the embodiment of the present invention.

It is assumed that the sensor information obtaining unit 11 continuously obtains each piece of sensor information, for example, at predetermined intervals. Examples of each piece of sensor information include position information using the GNSS satellite 22, the angular velocity of the vehicle 2 and the inclination angle of the vehicle 2, which are obtained using the inertial sensor, and the like. The sensor information obtaining unit 11 records the obtained sensor information in the storage unit 19. In addition, the odometer keeps measuring a travel distance of the vehicle 2.

First, the sensor information obtaining unit 11 obtains position information from the GNSS satellite 22 (step S21), and outputs the position information to the first travel distance calculation unit 12. The first travel distance calculation unit 12 matches the position information on the vehicle 2 obtained from the GNSS satellite 22 with map information stored in the storage unit 19 to identify a road and a position in the road where the vehicle 2 exists.

Next, the first travel distance calculation unit 12 uses the identified position to detect that the vehicle 2 passes through the starting position of the correction-factor calculation section (step S22). For example, the starting position and the ending position of the correction-factor calculation section are set in the map information. The first travel distance calculation unit 12 compares the starting position of the correction-factor calculation section set in the map information with position information on the vehicle 2 obtained using the GNSS satellite, and determines that the vehicle 2 passes through the starting position in a case where the position information on the vehicle 2 changes from outside of the correction-factor calculation section to inside of the correction-factor calculation section. In a case where the first travel distance calculation unit 12 determines that the vehicle 2 passes through the starting position, the second travel distance calculation unit 13 records the measured values of the odometer at the time of passing, in the storage unit 19. In the example of FIG. 3, the position 105 corresponds to the starting position of the correction-factor calculation section, and the position 106 corresponds to the ending position. In a case where the vehicle 2 passes through the position 105, the first travel distance calculation unit 12 determines that the vehicle 2 passes through the starting position of the correction-factor calculation section.

Next, the first travel distance calculation unit 12 determines whether the reliability of the position information using the GNSS satellite 22 is greater than or equal to a reference level (step S23). For example, in a case where the number of GNSS satellites 22 that communicate with the GNSS receiver is three or more, the first travel distance calculation unit 12 determines that the reliability is greater than or equal to the reference level. In addition, for example, in a case where the number of GNSS satellites 22 that communicate with the GNSS receiver is two or less, the first travel distance calculation unit 12 determines that the reliability is less than or equal to the reference level. In a case where the first travel distance calculation unit 12 determines that the reliability is less than or equal to the reference level (NO in step S23), the first travel distance, which is necessary for calculating the correction factor, cannot be calculated, and hence, this processing flow ends without processing of the correction factor. On the other hand, in a case where the first travel distance calculation unit 12 determines that the reliability is greater than or equal to the reference level (YES in step S23), the first travel distance calculation unit 12 gives the correction factor calculation unit 14 an instruction for calculating a correction factor (step S24).

Next, the first travel distance calculation unit 12 detects that the vehicle 2 passes through the ending position of the correction-factor calculation section (step S25). For example, the first travel distance calculation unit 12 compares the ending position of the correction-factor calculation section set in the map information with position information on the vehicle 2 obtained using the GNSS satellite, and determines that the vehicle 2 passes through the ending position in a case where the position information on the vehicle 2 changes from inside of the correction-factor calculation section to outside of the correction-factor calculation section. In the example of FIG. 3, in a case where the vehicle 2 passes through the position 106, the first travel distance calculation unit 12 determines that the vehicle 2 passes through the ending position of the correction-factor calculation section. In a case where the first travel distance calculation unit 12 determines that the vehicle 2 passes through the ending position of the correction-factor calculation section, the second travel distance calculation unit 13 records the measured values of the odometer at the time of passing, in the storage unit 19.

Next, the correction factor calculation unit 14 calculates the correction factor (step S26). More specifically, the correction factor calculation unit 14 requests the first travel distance from the first travel distance calculation unit 12. On the basis of the map information, the first travel distance calculation unit 12 calculates the distance of a road in a range set to be the correction-factor calculation section, and outputs the calculated distance (first travel distance) to the correction factor calculation unit 14. The correction factor calculation unit 14 requests a travel distance obtained using the odometer from the second travel distance calculation unit 13. The second travel distance calculation unit 13 subtracts the measured values of the odometer at the starting position of the correction-factor calculation section from the measured values of the odometer at the ending position of the correction-factor calculation section recorded in the storage unit 19 to calculate the travel distance obtained using the odometer in the correction-factor calculation section. The second travel distance calculation unit 13 outputs the calculated travel distance to the correction factor calculation unit 14. For example, the correction factor calculation unit 14 divides the first travel distance by the travel distance obtained using the odometer to calculate the correction factor. The correction factor calculation unit 14 records the calculated correction factor in the storage unit 19.

Furthermore, in the case where the road in the correction-factor calculation section is curved, the correction factor calculation unit 14 associates the value of angular velocity of the vehicle 2 measured during the time when the vehicle 2 travels in this correction-factor calculation section with the correction factor to record them. In addition, in the case where the correction-factor calculation section is in a slope road, the correction factor calculation unit 14 associates the inclination angle of the vehicle 2 measured during the time when the vehicle 2 travels in this correction-factor calculation section with the correction factor to record them. In addition, for example, in the case where the surface of a road in the correction-factor calculation section is icy, the correction factor calculation unit 14 associates the information indicating the icy road surface with the correction factor to record them.

In the flowchart in FIG. 6, a description has been made by giving an example in which the correction factor is calculated on the assumption that the correction-factor calculation section is set in advance. However, the embodiment is not limited to this. For example, the correction factor calculation unit 14 may use, for example, the first travel distance when accurate map information is provided and the vehicle 2 travels in a section in which the state of communication with the GNSS satellite is favorable, to calculate a correction factor.

As described above, in a case where, during a time when the vehicle 2 travels on a certain road, the road is determined to be under a road environment where the first travel distance can be calculated, the correction factor calculation unit 14 compares the travel distance calculated by the first travel distance calculation unit 12 at the time when the vehicle 2 travels on the road (the same road), with the travel distance based on the number of rotations of a tire to calculate a correction factor. This enables the accuracy of the travel distance calculated by the second travel distance calculation unit 13 to be brought closer to the accuracy in calculation of the travel distance obtained by the first travel distance calculation unit 12.

Note that the method for calculating a correction factor is not limited to the method described above. For example, it may be possible to use, as the correction factor, the average of values obtained by dividing the first travel distance by the travel distance obtained using the odometer. Alternatively, it may be possible to use, as the correction factor, the difference between the first travel distance and the travel distance obtained using the odometer per unit of distance.

Flow of Charge Processing

Next, using FIG. 3 as an example, a flow of charge processing using the travel distance calculated by the travel distance calculation device 10 will be described.

Figure 7:
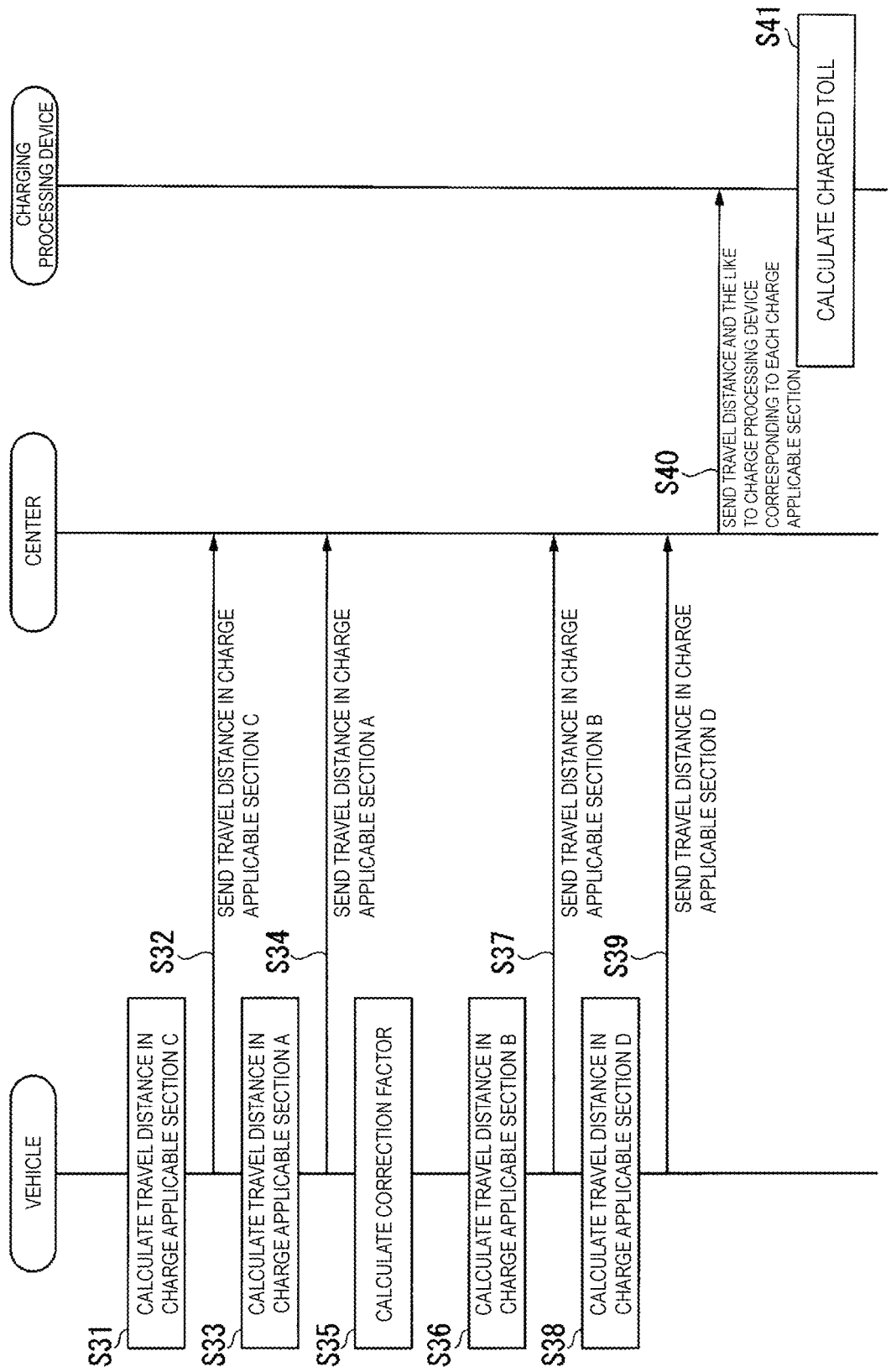
FIG. 7 is a flowchart of an example of charge processing according to an embodiment of the present invention.

FIG. 7 is a flowchart of an example of charge processing according to the embodiment of the present invention.

In a case where the vehicle 2 starts at the position 98, passes through a private road, and travels in the charge applicable section C of the road 101, the travel distance calculation device 10 first calculates the travel distance in the charge applicable section C (step S31). The method for calculating the travel distance has been already described with reference to FIG. 5. Upon calculation of the travel distance in the charge applicable section C, the travel distance calculation device 10 associates the travel distance in the charge applicable section C, the identification information on the charge applicable section C, and the identification information on the vehicle 2 with each other to send them to the central system 20 (step S32). More specifically, the travel distance in the charge applicable section C recorded in the storage unit 19 by the travel distance identification unit 17 is read, and is sent through the communication unit 18 to the central system 20. After this, similarly, in a case where the vehicle 2 travels in the charge applicable section A, the travel distance calculation device 10 calculates the travel distance in the charge applicable section A (step S33). The travel distance calculation device 10 associates the travel distance in the charge applicable section A, the identification information on the charge applicable section A, and the identification information on the vehicle 2 with each other to send them to the central system 20 (step S34). In addition, since the charge applicable section A includes the correction-factor calculation section E, the correction factor calculation unit 14 uses the first travel distance in the correction-factor calculation section E and the travel distance obtained using the odometer to calculate a correction factor (step S35). Next, in a case where the vehicle 2 travels in the charge applicable section B, the travel distance calculation device 10 calculates the travel distance in the charge applicable section B (step S36). The travel distance calculation device 10 associates the travel distance in the charge applicable section B, the identification information on the charge applicable section B, and the identification information on the vehicle 2 with each other to send them to the central system 20 (step S37). Next, in a case where the vehicle 2 travels in the charge applicable section D, the travel distance calculation device 10 calculates the travel distance in the charge applicable section D (step S38). The travel distance calculation device 10 associates the travel distance in the charge applicable section D, the identification information on the charge applicable section D, and the identification information on the vehicle 2 with each other to send them to the central system 20 (step S39).

As described above, the travel distance calculation device 10 calculates the travel distance for each charge applicable section in association with travel of the vehicle 2, and sends the calculation results to the central system 20. The central system 20 receives, for each charge applicable section, information in which the travel distance in the corresponding charge applicable section and the identification information on the charge applicable section are set. Next, the central system 20 sends the travel distance in each of the charge applicable sections to the charge processing device 21 that performs charge processing for the charge applicable sections (step S40). For example, the central system 20 sends the travel distance in the charge applicable section A and the identification information on the vehicle 2 to the charge processing device 21A that performs charge processing for the travel in the charge applicable section A. Similarly, the central system 20 sends the travel distance in the charge applicable section B and the identification information on the vehicle 2 to the charge processing device 21B. The central system 20 sends the travel distance in the charge applicable section C and the identification information on the vehicle 2 to the charge processing device 21C. The central system 20 sends the travel distance in the charge applicable section D and the identification information on the vehicle 2 to the charge processing device 21D.

Each of the charge processing devices 21A to 21D calculates a charged toll that is charged for the vehicle 2, according to the travel distance of the vehicle 2 in the corresponding charge applicable section (step S41). For example, the charge processing device 21A multiplies the travel distance in the charge applicable section A by a toll per km to calculate a charged toll that is charged for the vehicle 2. This similarly applies to the charge processing devices 21B to 21D. Note that the toll per km may differ among the charge applicable sections A to D. In addition, the charge processing devices 21A to 21D may charge the same toll, regardless of the travel distance. The charge processing devices 21A to 21D perform a settling process in which the calculated charged toll is collected for the vehicle 2.

According to the present embodiment, the travel distance calculation device 10 can select appropriate calculation means for a travel distance depending on conditions of a road on which the vehicle 2 travels, and hence, it is possible to accurately calculate the travel distance that is necessary for making a charge. In addition, the travel distance measured using the odometer can be corrected using a correction factor even for a road for which accurate position information is not provided, and hence, the travel distance calculation device 10 can calculate an accurate travel distance. In addition, the travel distance calculation device 10 can calculate a travel distance for each charge applicable section, and hence, in the case where a vehicle travels across a plurality of charge applicable sections having different charging methods, the travel distance can be calculated for each unit (unit of charge applicable section) in which charge processing is performed. In addition, the travel distance calculation device 10 calculates the travel distance by excluding toll-free roads (for example, private roads) for which no charge is made.

Furthermore, according to the present embodiment, the charging system 1 can perform charge processing for each charge applicable section on the basis of the travel distance calculated by the travel distance calculation device 10.

OTHER EMBODIMENTS

Note that in the embodiment described above, the configuration is described, as an example, in which the travel distance calculation device 10 mounted on the vehicle 2 calculates a travel distance, and the charge processing devices 21A to 21D calculate a charged toll according to travel distances. However, it may be possible to employ a configuration in which a toll calculation device that calculates a charged toll for each charge applicable section is mounted on the vehicle 2. In the case of this configuration, the travel distance calculation device 10 outputs a travel distance for each charge applicable section to the toll calculation device. The toll calculation device calculates a charged toll for each charge applicable section. The toll calculation device sends the charged toll for each charge applicable section, the identification information on the charge applicable section, and the identification information on the vehicle 2 to the central system 20. The central system 20 sends the travel distance in each of the charge applicable sections to the charge processing device 21 that corresponds to each of the charge applicable sections. Each of the charge processing devices 21 performs a settling process for the charged toll for the vehicle 2.

Furthermore, description has been made of a case, as an example, in which angular velocity measured using the inertial sensor is used for a determination condition for a curved road. However, the shape of a road may be determined using angular acceleration.

In addition, in the calculation process for a travel distance in a certain charge applicable section, the calculation-means selecting unit 16 may switch the first travel distance calculation unit 12 and the second travel distance calculation unit 13 to make a selection as appropriate. For example, in the case where position information on the vehicle 2 can be obtained in a single charge applicable section on a highway using the GNSS satellite 22 at first, and then, signals from the GNSS satellite 22 cannot be obtained, for example, due to troubles of the GNSS receiver, the calculation-means selecting unit 16 may selects the second travel distance calculation unit 13, and the travel distance identification unit 17 may identify the second travel distance for a section traveled after the trouble.

Furthermore, in a section where accurate map information is provided and a state of communication with the GNSS satellite 22 is generally favorable, in the case where this state of communication with the GNSS satellite 22 has deteriorated, this case may be dealt with, for example, by calculating the position information on the vehicle 2 using an autonomous navigation method for a predetermined period of time after the deterioration. In the case where the state of communication still does not recover, switch may be made to the second travel distance calculation unit 13 to calculate the travel distance.

In addition, a description has been made by using, as an example, a case in which a road for which no charge is made (toll-free road) is a private road. However, in a case where, other than a private road, there is a toll-free road for which no charge is made, the travel distance may not be calculated for the road, as is the case with the private road.

Note that, in the embodiment described above, a program for achieving various functions of the travel distance calculation device 10 is recorded in a computer readable storing medium, and a computer system is caused to read and execute the program that is recorded in the storage medium to implement various processes. Here, various process steps of the travel distance calculation device 10 described above are recorded in the computer readable storing medium in the form of a program, and the computer reads and executes the program to implement the various processes described above. Here, the computer readable storing medium refers to a magnetic disk, a magneto-optical disk, a CD-ROM, a DVD-ROM, a semiconductor memory, or the like. This computer program may be distributed to the computer on a communication line, and the computer that receives this distribution may execute the program.

Moreover, it may be possible to employ a mode in which various functions of the travel distance calculation device 10 are held by a plurality of devices connected by a network.

In the foregoing, certain embodiments of the present invention have been described, but these embodiments are merely illustrative and are not intended to limit the scope of the invention. These embodiments may be implemented in various other forms, and various omissions, substitutions, and alterations may be made without departing from the gist of the invention. These embodiments and modifications are included in the scope and gist of the invention and are also included in the scope of the invention described in the claims and equivalents thereof.

INDUSTRIAL APPLICABILITY

The travel distance calculation device, the travel distance calculation method, the program, and the storage medium described above enable the travel distance of a vehicle to be calculated in an accurate manner. In addition, with the charging system described above, even in a case where a vehicle travels across charge applicable sections that employ different charging methods, it is possible to perform charge processing according to travel distances in respective charge applicable sections.

REFERENCE SIGNS LIST

1 Charging system
2 Vehicle
10 Travel distance calculation device
11 Sensor information obtaining unit
12 First travel distance calculation unit
13 Second travel distance calculation unit
14 Correction factor calculation unit
15 Road condition determination unit
16 Calculation-means selecting unit 17 Travel distance identification unit
18 Communication unit
19 Storage unit
20 Central system
21, 21A, 21B, 21C, 21D Charge processing device
22, 22A, 22B, 22C GNSS Satellite

The invention claimed is:

1. A travel distance calculation device, comprising:
a first travel distance calculation unit configured to calculate a travel distance of a vehicle on the basis of position information on the vehicle obtained through position determination using a Global Navigation Satellite System (GNSS) satellite;
a second travel distance calculation unit configured to calculate a travel distance of the vehicle on the basis of the number of rotations of a tire that the vehicle includes;
a selecting unit configured to select the first travel distance calculation unit or the second travel distance calculation unit to calculate the travel distance of the vehicle on the basis of at least one of the position information on the vehicle obtained through position determination using the GNSS satellite and information indicating a state of communication with the GNSS satellite;
a correction factor calculation unit configured to calculate a correction factor for correcting the travel distance based on the number of rotations of a tire, the correction factor being calculated on the basis of a relationship between the travel distance calculated by the first travel distance calculation unit and the travel distance based on the number of rotations of a tire;
a road condition determination unit configured to determine a road condition of a road on which the vehicle travels on the basis of attitude information on the vehicle; and
a charge processing device configured to perform charge processing on the basis of a travel distance calculated by the travel distance calculation device,
wherein the second travel distance calculation unit is configured to correct the travel distance based on the number of rotations of a tire using the correction factor calculated by the correction factor calculation unit,
wherein the correction factor calculation unit is configured to calculate a plurality of the correction factors according to a road condition, and
wherein the second travel distance calculation unit is configured to select a correction factor according to the road condition determined by the road condition determination unit from among the plurality of the correction factors, and calculate the travel distance using the correction factor that is selected.

2. The travel distance calculation device according to claim 1, wherein
the first travel distance calculation unit is configured to match the position information on the vehicle with map information to identify which road in the map information includes a position indicated by the position information on the vehicle, and
the selecting unit is configured to select the first travel distance calculation unit or the second travel distance calculation unit on the basis of information on the road identified by the first travel distance calculation unit.

3. The travel distance calculation device according to claim 2, wherein
the selecting unit is configured to select the first travel distance calculation unit in a case where the road that is identified is determined to be a highway, a national highway, or a main road.

4. The travel distance calculation device according to claim 2, wherein
when the selecting unit selects the first travel distance calculation unit or the second travel distance calculation unit on the basis of both of the position information on the vehicle obtained through position determination using the GNSS satellite and information indicating a state of communication with the GNSS satellite, the selecting unit is configured to select the first travel distance calculation unit in a case where the road that is identified is determined to be a highway, a national highway, or a main road and where the number of the GNSS satellites that is communicated is three or more.

5. The travel distance calculation device according to claim 2, wherein
the selecting unit is configured to select the second travel distance calculation unit in a case where the road that is identified is determined not to be a highway, a national highway, or a main road or in a case where the number of the GNSS satellites that is communicated is two or less.

6. The travel distance calculation device according to claim 1, wherein
when the selecting unit selects the first travel distance calculation unit or the second travel distance calculation unit on the basis of both of the position information on the vehicle obtained through position determination using the GNSS satellite and information indicating a state of communication with the GNSS satellite, in a case where the vehicle travels on a highway, a national highway, or a main road and the number of the GNSS satellites that is communicated is three or more, the correction factor calculation unit is configured to record the travel distance calculated by the first travel distance calculation unit.

7. The travel distance calculation device according to claim 6, wherein
the correction factor calculation unit is further configured to associate attitude information on a vehicle that travels on the road with the correction factor that is calculated to record the attitude information and the correction factor.

8. The travel distance calculation device according to claim 1, further comprising:
a travel distance identification unit configured to identify a travel distance of the vehicle for each charge applicable section.

9. The travel distance calculation device according to claim 8, wherein
the travel distance identification unit is configured to identify a travel distance by excluding the travel distance of the vehicle in a toll-free road.

10. A travel distance calculation method, comprising:
selecting, to calculate a travel distance of a vehicle,
first means configured to calculate the travel distance of the vehicle on the basis of position information on the vehicle obtained through position determination using a Global Navigation Satellite System (GNSS) satellite, or
second means configured to calculate a travel distance of the vehicle on the basis of the number of rotations of a tire that the vehicle includes, on the basis of at least one of the position information on the vehicle obtained through position determination using the GNSS satellite and information indicating a state of communication with the GNSS satellite, calculating a correction factor for correcting the travel distance based on the number of rotations of a tire, the correction factor being calculated on the basis of a relationship between the travel distance calculated by the first travel distance calculation unit and the travel distance based on the number of rotations of a tire, determining a road condition of a road on which the vehicle travels on the basis of attitude information on the vehicle; and performing charge processing on the basis of the calculated travel distance, wherein the second means is configured to correct the travel distance based on the number of rotations of a tire using the correction factor calculated by the correction factor calculation unit, wherein, in the calculating of the correction factor, a plurality of the correction factors according to a road condition is calculated, and wherein the second means is configured to select a correction factor according to the road condition determined by the road condition determination unit from among the plurality of the correction factors, and calculate the travel distance using the correction factor that is selected.

11. A non-transitory storage medium that stores a program for causing a computer that a travel distance calculation device includes to function as:

first means configured to calculate a travel distance of a vehicle on the basis of position information on the vehicle obtained through position determination using a Global Navigation Satellite System (GNSS) satellite;

second means configured to calculate a travel distance of the vehicle on the basis of the number of rotations of a tire that the vehicle includes;

selecting means configured to select the first means or the second means, to calculate the travel distance of the vehicle on the basis of at least one of the position information on the vehicle obtained through position determination using the GNSS satellite and information indicating a state of communication with the GNSS satellite;

calculating means configured to calculate a correction factor for correcting the travel distance based on the number of rotations of a tire, the correction factor being calculated on the basis of a relationship between the travel distance calculated by the first means and the travel distance based on the number of rotations of a tire;

determining means configured to determine a road condition of a road on which the vehicle travels on the basis of attitude information on the vehicle; and performing charge processing on the basis of the calculated travel distance, wherein the second means is configured to correct the travel distance based on the number of rotations of a tire using the correction factor calculated by the calculating means, wherein the calculating means is configured to calculate a plurality of the correction factors according to a road condition, and wherein the second means is configured to select a correction factor according to the road condition determined by the determining means from among the plurality of the correction factors, and calculate the travel distance using the correction factor that is selected.

* * * * *